US012681350B2

(12) United States Patent
Chen et al.

(10) Patent No.: US 12,681,350 B2
(45) Date of Patent: Jul. 14, 2026

(54) FRICTIONAL ALIGNMENT DEVICE FOR CURVED SUBSTRATE AND METHOD OF USE THEREOF

(71) Applicants:Interface Technology (ChengDu) Co., Ltd., Chengdu (CN); Interface Optoelectronics (ShenZhen) Co., Ltd., Shenzhen (CN); General Interface Solution Limited, Miaoli County (TW)

(72) Inventors: Chien-Cheng Chen, Miaoli County (TW); Po-Lun Chen, Miaoli County (TW); Yun-Pei Chen, Miaoli County (TW)

(73) Assignees: Interface Technology (ChengDu) Co., Ltd., Chengdu (CN); Interface Optoelectronics (ShenZhen) Co., Ltd., ShenZhen (CN); General Interface Solution Limited, Miaoli County (TW)

( * ) Notice: Subject to any disclaimer, the term of this patent is extended or adjusted under 35 U.S.C. 154(b) by 432 days.

(21) Appl. No.: 18/383,529

(22) Filed: Oct. 25, 2023

(65) Prior Publication Data

US 2025/0028206 A1     Jan. 23, 2025

(30) Foreign Application Priority Data

Jul. 21, 2023     (CN) .......................... 202310900851.0

(51) Int. Cl.
| | |
|---|---|
| *B25B 11/00* | (2006.01) |
| *B25J 15/06* | (2006.01) |
| *G02F 1/1337* | (2006.01) |

(52) U.S. Cl.
CPC .... *G02F 1/133784* (2013.01); *B25J 15/0616* (2013.01); *G02F 2201/56* (2013.01)

(58) Field of Classification Search
CPC ....... B25B 11/00; B25B 11/005; B25B 11/02; B23Q 3/00; B23Q 3/088; B23Q 3/154; B23Q 3/152
See application file for complete search history.

(56) References Cited

U.S. PATENT DOCUMENTS

| | | | | |
|---|---|---|---|---|
| 3,777,350 A | * | 12/1973 | Maeda | ............... H05K 13/0473 |
| | | | | 29/818 |
| 2024/0375960 A1 | * | 11/2024 | Park | ........................ C01B 32/19 |
| 2025/0028206 A1 | * | 1/2025 | Chen | .................... B25J 15/0616 |
| 2025/0194751 A1 | * | 6/2025 | Mallory | .................... B32B 5/02 |

* cited by examiner

*Primary Examiner* — Lee D Wilson
(74) *Attorney, Agent, or Firm* — Troutman Pepper Locke LLP; Tim Tingkang Xia, Esq.

(57) ABSTRACT

A friction alignment device for a curved substrate, which includes: a rotating sleeve, a friction alignment roller, a carrying device and a movable platform. The friction alignment roller is connected to the rotating sleeve and has a curved plane. The carrying device adsorbs a curved substrate to a carrying curved surface. Among them, the carrying device adjusts a height so that the curved plane and the curved substrate are in contact with an alignment pressure, and the rotating sleeve is used to rub the curved substrate, and at the same time, the movable platform performs a displacement of the height, and the curved substrate undergoes three-dimensional friction alignment.

12 Claims, 15 Drawing Sheets

1

FRICTIONAL ALIGNMENT DEVICE FOR CURVED SUBSTRATE AND METHOD OF USE THEREOF

CROSS-REFERENCE TO RELATED APPLICATIONS

This application claim priority to Chinese application Numbered 2023109008510, filed Jul. 21, 2023, which is herein incorporated by reference in its' integrity.

FIELD OF THE INVENTION

The present invention relates to a friction alignment device for a curved substrate, in particular a friction alignment device that can be used according to different curvature substrates and methods for using it.

BACKGROUND OF THE INVENTION

The vigorous development of digital technology has promoted the rise of electronic entertainment, making more people pursue the stimulation of visual experience, but the biggest credit for the popularity of visual experience is the advent of LCD panels. In the manufacturing process of liquid crystal displays, it is necessary to create a uniformly oriented orientation layer on the substrate to ensure that the liquid crystal molecules can be arranged uniformly and orderly on the orientation layer. Orientation layers can usually be manufactured by rubbing.

However, in the evolution history of LCD panels for decades, they can only perform the alignment of the flat substrate, and in the process of the LCD panel, it cannot be directly used on the curved substrate for orientation, because the friction alignment equipment is applied to the edge of the concave substrate for orientation, the concave substrate will not be aligned; The friction alignment device can be used in the middle of the convex substrate for orientation, but it cannot be aligned at the edge of the convex substrate.

At present, if concave or convex substrate alignment is required, it can only be manually aligned according to the curvature of the substrate, which not only consumes huge time, resulting in long-term vacancy of production equipment and long waiting of production personnel, but also wastes production raw materials, which not only seriously affects production capacity, but also wastes materials and human resources. Therefore, it is impossible to stabilize the quality control in the process, resulting in the lack of mass production of products.

SUMMARY OF THE INVENTION

The primary object of the present invention is to provide a friction alignment device for a curved substrate and method of use thereof. By installing a pressure sensing element under the vacuum vehicle, the pressure value required for friction alignment can be adjusted to achieve the effect of automatically adjusting and synchronizing friction alignment according to the curvature of the substrate.

The primary object of the present invention is to provide a friction alignment device for a curved substrate and method of use thereof. By using two carring devices with two substrates of different curvatures, the friction alignment function of the two curvatures can be synchronized to achieve the effect of reducing the time lost by constantly changing the fixture.

The primary object of the present invention is to provide a friction alignment device for a curved substrate and method of use thereof. The height adjustment of the adjustment seat and the plane orientation of the mobile platform device are used to achieve the effect of friction alignment of 3D curved substrates.

According to one aspect of the present invention, a friction alignment device for a curved substrate is provided, comprising: a rotating sleeve, a first friction alignment roller, a first carrying device and a movable platform. The rotating sleeve is centered in an axial direction with a rotational displacement movement. The first friction alignment roller is connected to the rotating sleeve, the surface of the outer edge of the first friction alignment roller has a first curvature plane. The first carrying device has a first height away from the axial direction, comprising: a first vacuum carrier, a first pressure sensing element and a first adjustment seat. The first vacuum carrier has a first carrying surface near to the side of the first friction alignment roller, the first curvature plane has the same curvature diameter as the first carrying surface, the first vacuum carrier is carried a first surface substrate, and the first surface substrate is adsorbed on the first carrying surface. The first pressure sensing element is telecommunications connected to the first vacuum carrier, the first pressure sensing element detected a first contact pressure of the first curved substrate and the first curvature plane. The first adjustment seat is connected to the first vacuum carrier, performed a first linear displacement motion to adjust the first height. The movable platform is connected to the first carrying device, the movable platform caused the first carrying device to carry out a second linear displacement motion, the second linear displacement motion is parallel to the axial direction. Wherein when the first height is adjusted by the first adjusting seat, the first contact pressure is the same as a matching pressure, the rotating sleeve carried out the rotational displacement movement, the first curvature plane rubs against the first curved substrate, and at the same time the movable platform is carried out the second linear displacement motion, and the first adjusting seat is adjusted the first height according to the surface of the outer edge of the first curved substrate, so that the first contact pressure is the same as the matching pressure.

Preferably, the friction alignment device for a curved substrate further comprises: a second friction alignment roller and a second carrying device. The second friction alignment roller is connected to the rotating sleeve, the surface of the outer edge of the second friction alignment roller has a second curvature plane. The second carrying device is connected to the movable platform, and has a second height away from the axial direction, comprising: a second vacuum carrier, a second pressure sensing element and a second adjustment seat. The second vacuum carrier has a second carrying surface near to the side of the second friction alignment roller, the second curvature plane has the same curvature diameter as the second carrying surface, the second vacuum carrier is carried a second surface substrate, and the second surface substrate is adsorbed on the second carrying surface. The second pressure sensing element is telecommunications connected to the second vacuum carrier, the second pressure sensing element detected a second contact pressure of the second curved substrate and the second curvature plane. The second adjustment seat is connected to the second vacuum carrier, performed a third linear displacement motion to adjust the second height, the third linear displacement motion is parallel to the first linear displacement motion. Wherein when the second height is adjusted by the second adjusting seat, the second contact pressure is the same as the matching pressure, the rotating sleeve is carried out the rotational displacement movement, the second curvature plane rubs against the second curved substrate, and at the same time the movable platform carried out the second linear displacement motion, and the second adjusting seat adjusted the second height according to the surface of the outer edge of the second curved substrate, so that the second contact pressure is the same as the matching pressure.

Preferably, the movable platform further comprises: a carrier platform, a lifting moving seat and a directional moving seat. The carrier platform is carried both the first adjustment seat and the second adjustment seat. The lifting moving seat is connected to the carrier platform, performed a fourth linear displacement motion, the fourth linear displacement motion is parallel to the first linear displacement motion. The directional moving seat is connected to the lifting moving seat, the lifting moving seat is carried out the second linear displacement motion.

Preferably, the rotating sleeve further comprises: a rotating shaft, a first sleeve and a second sleeve. The rotating shaft is a cylinder extending in the axial direction. The first sleeve is a hollow ring structure, is placed into the rotating shaft along the axial direction, and is fixed on the rotating shaft by a first positioner, and is connected to the first friction alignment roller. The second sleeve is a hollow ring structure, is placed into the rotating shaft along the axial direction, and is fixed on the rotating shaft by a second positioner, and is connected to the second friction alignment roller.

Preferably, the outer edge surface of the first friction alignment roller and the outer edge surface of the second friction alignment roller have a matching fluff cloth, the matching fluff cloth is made of natural fibers or artificial fibers.

Preferably, the first curvature plane and the second curvature plane have the same curvature diameter, and the center of first curvature plane and the center of second curvature plane are located on the second side of the rotating sleeve.

Preferably, the curvature diameters of the first curvature plane and the second curvature plane are between 20 millimeters and 1000 millimeters.

According to another aspect of the present invention, a method of using a friction alignment device for a curved substrate is provided, comprising the following steps:

(a) providing a rotating sleeve, a first friction alignment roller, a first carrying device and a movable platform, the first friction alignment roller is connected to the rotating sleeve, and the outer edge surface having a first curvature plane, the first carrying device is connected to the movable platform, and the first carrying device having a first carrying surface and a first height from the first curvature plane;

(b) providing a first curved substrate located on the first carrying surface;

(c) performing a first linear displacement movement to adjust the first height, the first curved substrate is near to the first curvature plane;

(c1) determining whether the first friction alignment roller is located on one end surface of the first curved substrate;

(c2) performing the second linear displacement movement and repeating step (c1), when the first friction alignment roller is not located on the end surface; performing step (d), when the first friction alignment roller is located on the end surface;

(d) detecting a first contact pressure between the first curved substrate and the first curvature plane;

(e) determining whether the first contact pressure and an matching pressure are the same; when the first contact pressure and the matching pressure are not the same, repeat step (c); when the first contact pressure and the matching pressure are the same, rotating the rotating sleeve by a rotational displacement movement along an axial direction as the center, and the first curvature plane rubbing the first curved substrate;

(f) performing a second linear displacement movement parallel to the axial direction;

(g) determining whether the first friction alignment roller is located on the first curved surface substrate; when the first friction alignment roller is located on the first curved surface substrate, repeat step (d); when the first friction alignment roller is not located on the first curved surface substrate, the operation stops.

According to another aspect of the present invention, a method of using a friction alignment device for a curved substrate is provided, comprising the following steps:

(a) providing a rotating sleeve, a first friction alignment roller, a second friction alignment roller, a first carrying device, a second carrying device and a movable platform, the first friction alignment roller is connected to the rotating sleeve, and the outer edge surface having a first curvature plane, the first carrying device and the second carrying device are connected to the movable platform, and the first carrying device having a first carrying surface and a first height from the first curvature plane, the second friction alignment roller is connected to the rotating sleeve, and the outer edge surface having a second curvature plane, and the second carrying device having a second carrying surface and a second height from the second curvature plane;

(b) providing a first curved substrate located on the first carrying surface, and a second curved substrate located on the second carrying surface;

(c) performing a first linear displacement movement to adjust the first height, the first curved substrate is near to the first curvature plane, and detecting a first contact pressure between the first curved substrate and the first curvature plane;

(c1) determining whether the first friction alignment roller is located on one end surface of the first curved substrate;

(c2) performing the second linear displacement movement and repeating step (c1), when the first friction alignment roller is not located on the end surface; performing step (d), when the first friction alignment roller is located on the end surface;

(d) determining whether the first contact pressure and an matching pressure are the same; when the first contact pressure and the matching pressure are not the same, repeat step (c);

(e) performing a third linear displacement movement to adjust the second height, the second curved substrate is near to the second curvature plane, and detecting a second contact pressure between the second curved substrate and the second curvature plane;

(e1) determining whether the second friction alignment roller is located on one end surface of the second curved substrate;

(e2) performing the second linear displacement movement and repeating step (e1), when the second friction alignment roller is not located on the end surface;

performing step (f), when the second friction alignment roller is located on the end surface;

(f) determining whether the second contact pressure and the matching pressure are the same; when the second contact pressure and the matching pressure are not the same, repeat step (e);

(g) rotating the rotating sleeve by a rotational displacement movement along an axial direction as the center, when the first contact pressure, the second contact pressure and the matching pressure are the same, the first curvature plane rubbing the first curved substrate and the second curvature plane rubbing the second curved substrate;

(h) performing a second linear displacement movement parallel to the axial direction;

(i) determining whether the first friction alignment roller is located on the first curved surface substrate; when the first friction alignment roller is located on the first curved surface substrate, repeat step (d);

(j) determining whether the second friction alignment roller is located on the second curved surface substrate; when the second friction alignment roller is located on the second curved surface substrate, repeat step (f);

(k) stopping the steps, when the first friction alignment roller is not located on the first curved surface substrate, and the second friction alignment roller is not located on the second curved surface substrate.

DETAILED DESCRIPTION OF THE PREFERRED EMBODIMENTS

Embodiments of the present invention will now be described, by way of example only, with reference to the accompanying drawings.

Figure 1:
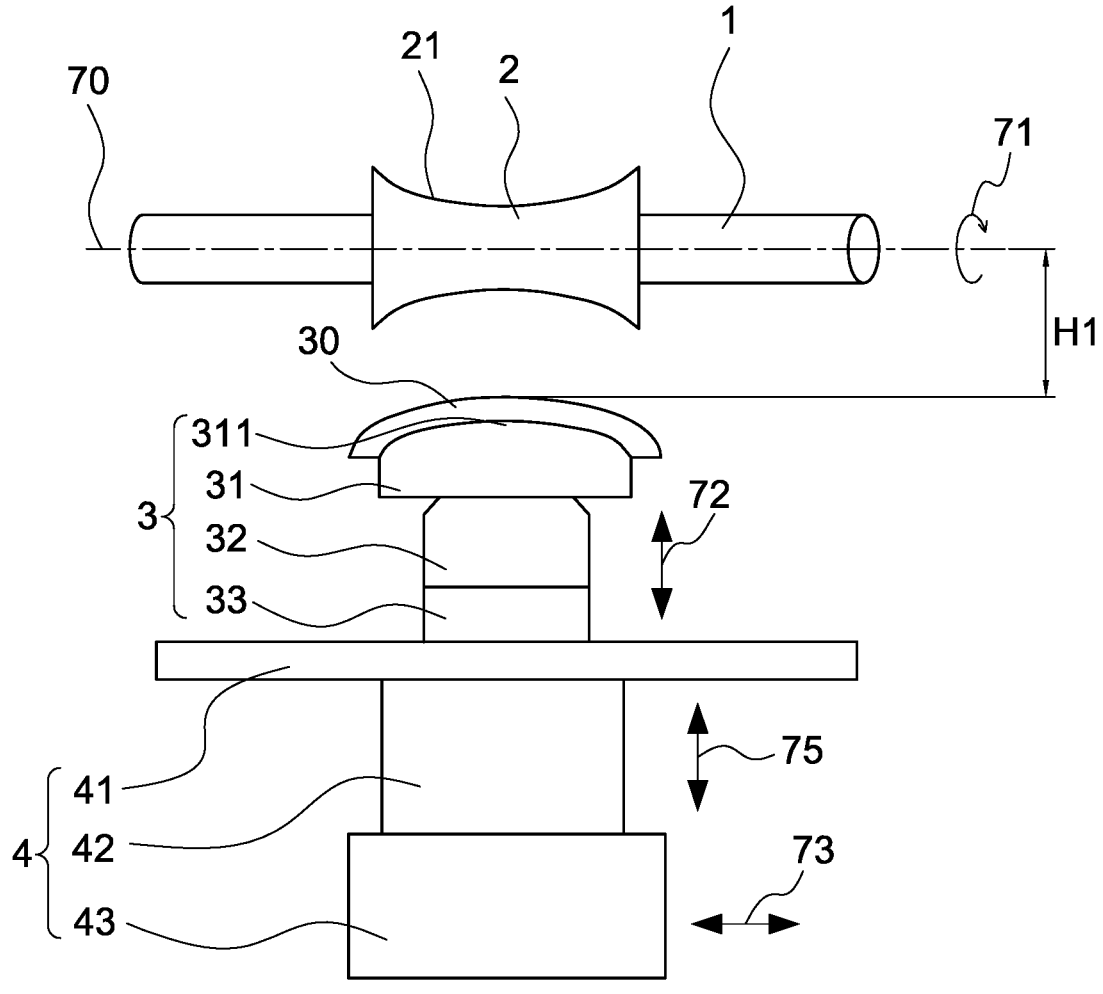
FIG. 1 is a schematic view of the first preferred embodiment of the friction alignment device of the curved substrate of the present invention.
Figure 3A:
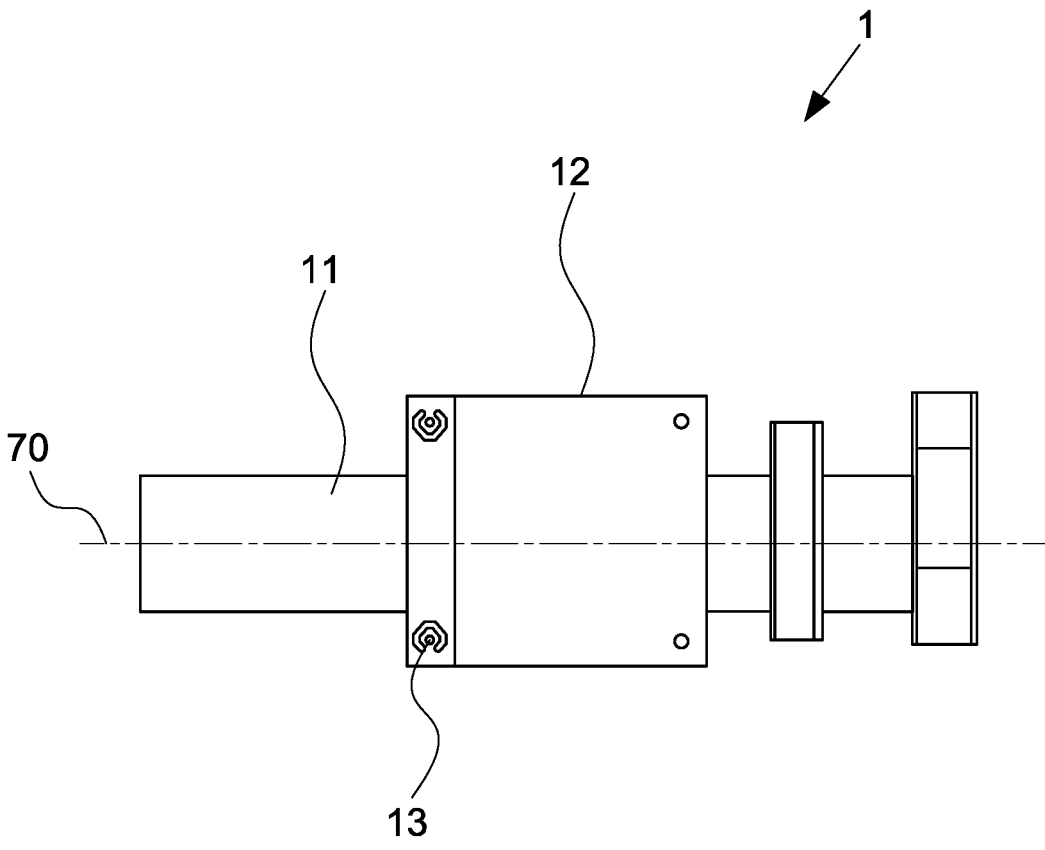
FIG. 3A is a schematic view of the first preferred embodiment of the rotating sleeve of the present invention.

Referring to FIGS. 1 and 3A, are a schematic view of the first preferred embodiment of the friction alignment device of the curved substrate and the rotating sleeve of the present invention. According to one aspect of the present invention, a friction alignment device for a curved substrate is provided, comprising: a rotating sleeve 1, a first friction alignment roller 2, a first carrying device 3 and a movable platform 4. The rotating sleeve 1 is centered in an axial direction 70 with a rotational displacement movement 71, the rotational displacement movement 71 rotates between 50 RPM and 6000 RPM. The rotating sleeve 1 further comprises: a rotating shaft 11 and a first sleeve 12. The rotating shaft 11 is a cylinder extending in the axial direction 70. The first sleeve 1 is a hollow ring structure, is placed into the rotating shaft 11 along the axial direction 70, and is fixed on the rotating shaft 11 by a first positioner 13, and is connected to the first friction alignment roller 2. The outer edge surface of the first friction alignment roller 2 has a first curvature plane 21 and has a matching fluff cloth (not shown in the figure). The matching fluff cloth is made of natural fibers or artificial fibers, the curvature diameter of the first curvature plane 21 is between 20 millimeters and 1000 millimeters.

The first carrying device 3 has a first height H1 away from the axial direction 70, comprising: a first vacuum carrier 31, a first pressure sensing element 32 and a first adjustment seat 33. The first vacuum carrier 31 has a first carrying surface 311 near to the side of the first friction alignment roller 2, the curvature diameter of the first carrying surface 311 is between 20 millimeters and 1000 millimeters, the first curvature plane 21 has the same curvature diameter as the first carrying surface 311, the first vacuum carrier 31 is carried a first surface substrate 30, and the first surface substrate 30 is adsorbed on the first carrying surface 311. The operating pressure of the first vacuum carrier 31 is greater than −65 kPa. The first pressure sensing element 32 is telecommunications connected to the first vacuum carrier 31, the first pressure sensing element 32 detected a first contact pressure of the first curved substrate 30 and the first curvature plane 21. The pressure sensing value of the first pressure sensing element 32 may be between 1 mg and 500 mg. The first adjustment seat 33 is connected to the first vacuum carrier 31, performed a first linear displacement motion 72 to adjust the first height H1. The first adjustment seat 33 performs the first linear displacement movement 72 in a fine-tuning movement mode, which generally travels at a rate of 0.1 millimeters to 0.5 millimeters per second.

The movable platform 4 is connected to the first carrying device 3, the movable platform 4 caused the first carrying device 3 to carry out a second linear displacement motion 73, the second linear displacement motion 73 is parallel to the axial direction 70. The movable platform 4 further comprises: a carrier platform 41, a lifting moving seat 42 and a directional moving seat 43. The carrier platform 41 is carried the first adjustment seat 33. The lifting moving seat 42 is connected to the carrier platform 41, performed a fourth linear displacement motion 75, the fourth linear displacement motion 75 is parallel to the first linear displacement motion 72. The lifting moving seat 42 performs the fourth linear displacement movement 75 in a coarse movement mode, which generally travels from 1 millimeter to 3 millimeters per second. The directional moving seat 43 is connected to the lifting moving seat 42, the lifting moving seat 42 is carried out the second linear displacement motion 73. The movement mode of the directional moving seat 43 in this direction is approximately 1 millimeter to 200 millimeters per second.

Wherein when the first height H1 is adjusted by the first adjusting seat 33, the first contact pressure is the same as a matching pressure, the rotating sleeve 1 carried out the rotational displacement movement 71, the first curvature plane 21 rubs against the first curved substrate 30, and at the same time the movable platform 4 is carried out the second linear displacement motion 73, and the first adjusting seat 33 is adjusted the first height H1 according to the surface of the outer edge of the first curved substrate 30, so that the first contact pressure is the same as the matching pressure, until the first curved substrate 30 is completely three-dimensionally rubbed and aligned.

Figure 2:
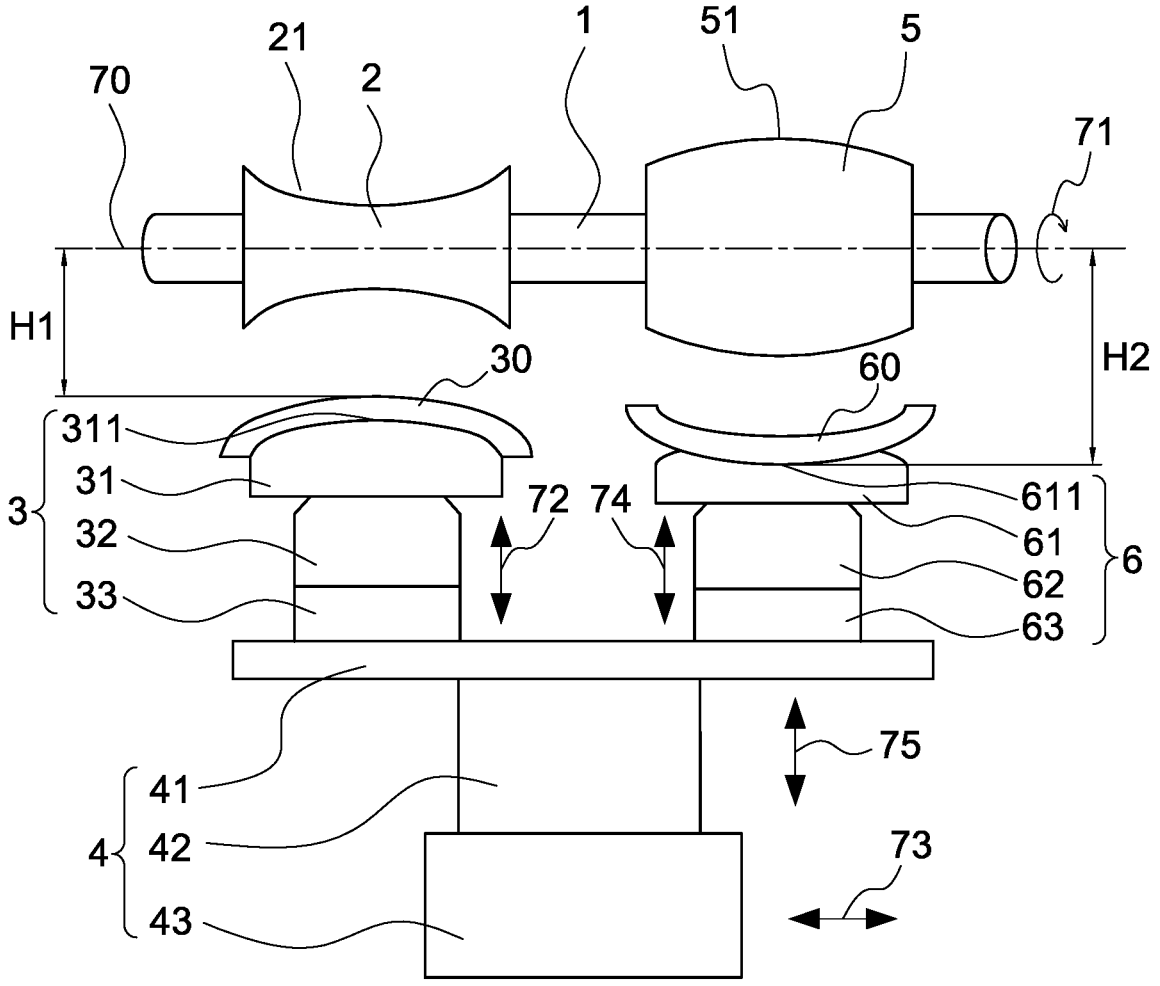
FIG. 2 is a schematic view of the second preferred embodiment of the friction alignment device of the curved substrate of the present invention.
Figure 3B:
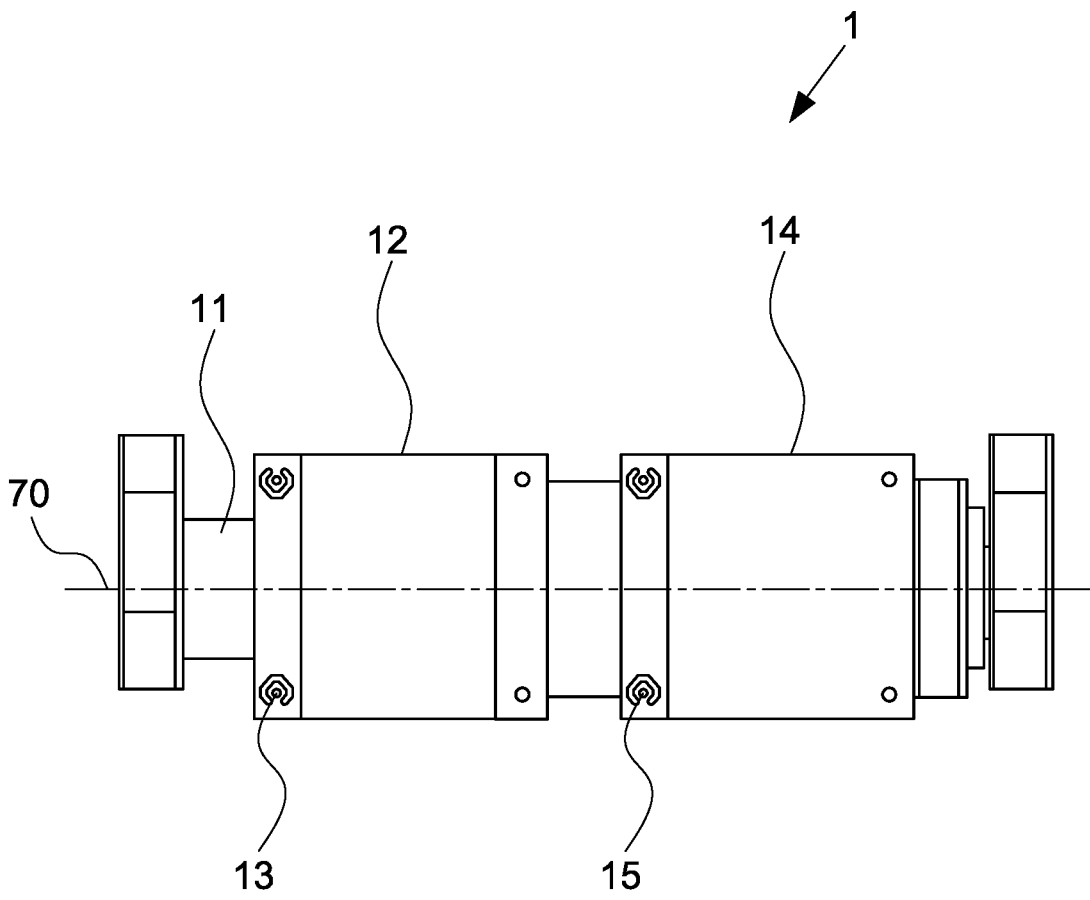
FIG. 3B is a schematic view of the second preferred embodiment of the rotating sleeve of the present invention.

Referring to FIGS. 2 and 3B, are a schematic view of the second preferred embodiment of the friction alignment device of the curved substrate and the rotating sleeve of the present invention. The friction alignment device of the curved surface substrate of the present invention performs the friction alignment function of two curvatures simultaneously to achieve the effect of reducing the time wasted by constantly changing fixtures. Therefore, it further includes: a second friction alignment roller 5 and a second carrying device 6. Devices that are the same as those in the above embodiment are given the same reference numerals and will not be described again. Preferably, the rotating sleeve 1 further comprises a second sleeve 14. The second sleeve 14 is a hollow ring structure, is placed into the rotating shaft 11 along the axial direction 70, and is fixed on the rotating shaft 11 by a second positioner 15, and is connected to the second friction alignment roller 5. The outer edge surface of the second friction alignment roller 5 has a second curvature plane 51 and has a matching fluff cloth (not shown in the figure). The matching fluff cloth is made of natural fibers or artificial fibers, the curvature diameter of the second curvature plane 51 is between 20 millimeters and 1000 millimeters.

The second carrying device 6 is connected to the movable platform 4, the second carrying device 6 has a second height H2 away from the axial direction 70, comprising: a second vacuum carrier 61, a second pressure sensing element 62 and a second adjustment seat 63. The second vacuum carrier 61 has a second carrying surface 611 near to the side of the second friction alignment roller 5, the curvature diameter of the second carrying surface 611 is between 20 millimeters and 1000 millimeters, the second curvature plane 51 has the same curvature diameter as the second carrying surface 611, the second vacuum carrier 61 is carried a second surface substrate 60, and the second surface substrate 60 is adsorbed on the second carrying surface 611. The operating pressure of the second vacuum carrier 61 is greater than −65 kPa. The second pressure sensing element 62 is telecommunications connected to the second vacuum carrier 61, the second pressure sensing element 62 detected a second contact pressure of the second curved substrate 60 and the second curvature plane 51. The pressure sensing value of the second pressure sensing element 62 may be between 1 mg and 500 mg. The second adjustment seat 63 is connected to the second vacuum carrier 61, performed a third linear displacement motion 74 to adjust the second height H2. The second adjustment seat 63 performs the third linear displacement movement 74 in a fine-tuning movement mode, which generally travels at a rate of 0.1 millimeters to 0.5 millimeters per second.

Wherein when the second height H2 is adjusted by the second adjusting seat 63, the second contact pressure is the same as a matching pressure, the rotating sleeve 1 carried out the rotational displacement movement 71, the second curvature plane 51 rubs against the second curved substrate 60, and at the same time the movable platform 4 is carried out the second linear displacement motion 73, and the second adjusting seat 63 is adjusted the second height H2 according to the surface of the outer edge of the second curved substrate 60, so that the second contact pressure is the same as the matching pressure, until the second curved substrate 60 is completely three-dimensionally rubbed and aligned.

Figure 4:
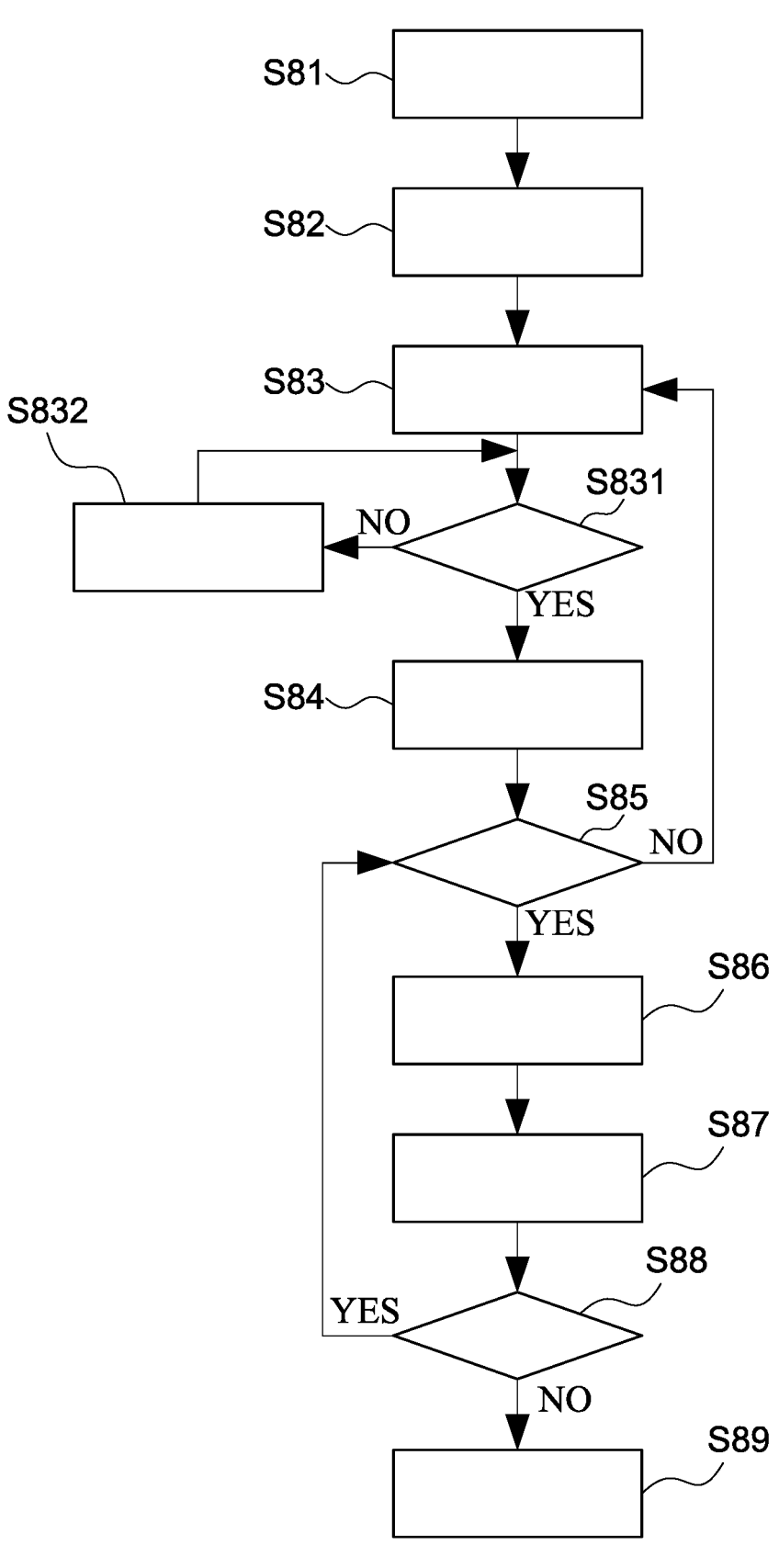
FIG. 4 is a block diagram of the first preferred embodiment of the method of using the friction alignment device for the curved substrate of the present invention.
Figure 5A:
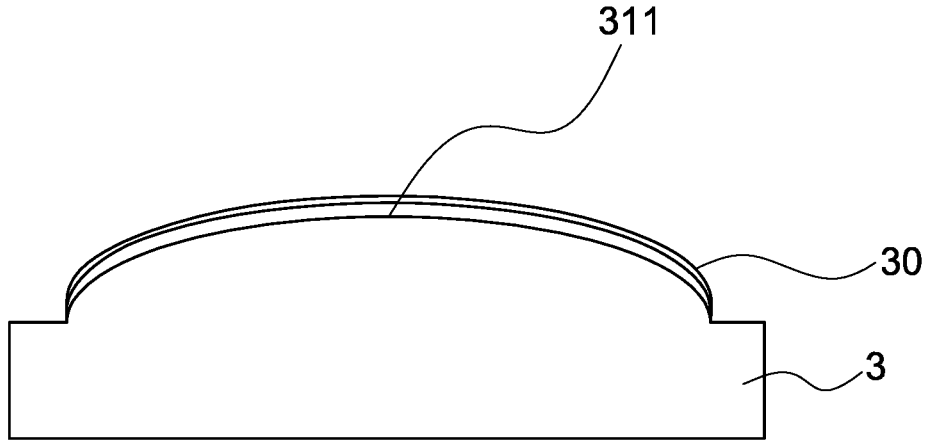
FIG. 5A is a schematic diagram of the first action of the first preferred embodiment of the method of using the friction alignment device for the curved substrate of the present invention.
Figure 5B:
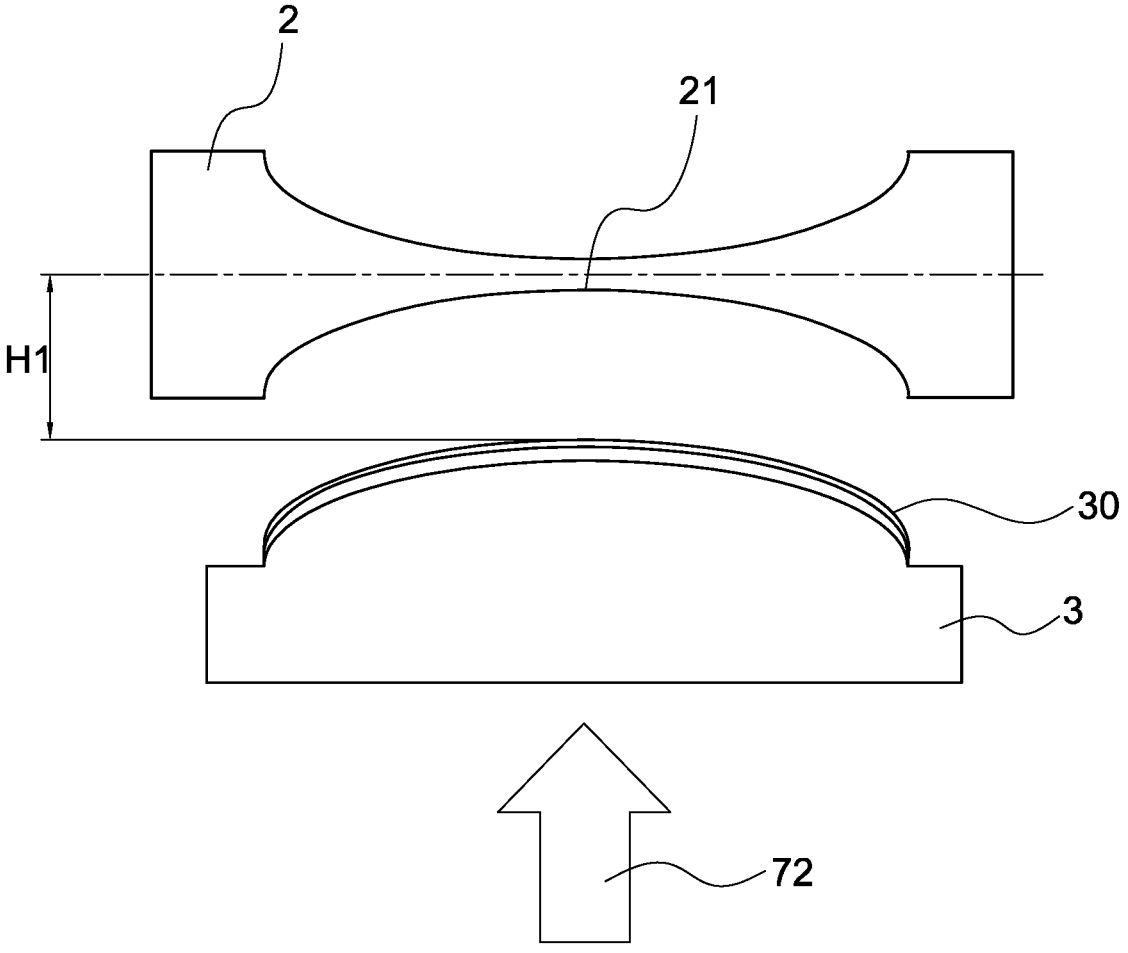
FIG. 5B is a schematic diagram of the second action of the first preferred embodiment of the method of using the friction alignment device for the curved substrate of the present invention.
Figure 5C:
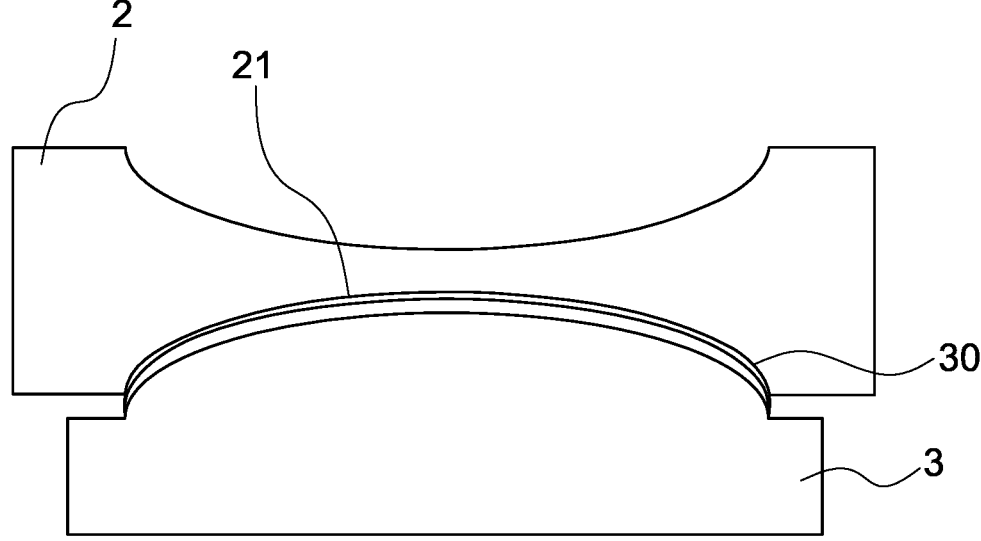
FIG. 5C is a schematic diagram of the third action of the first preferred embodiment of the method of using the friction alignment device for the curved substrate of the present invention.
Figure 5D:
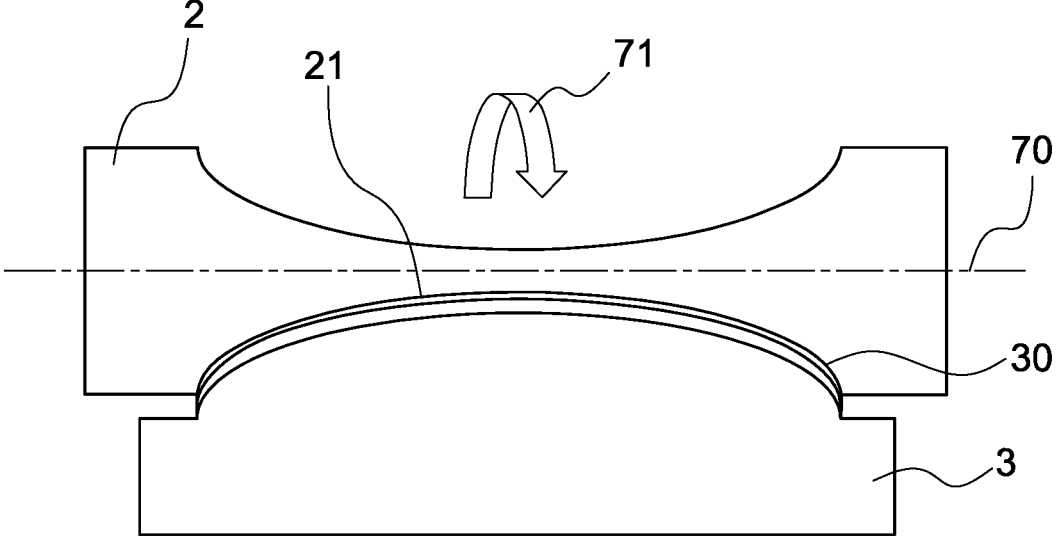
FIG. 5D is a schematic diagram of the fourth action of the first preferred embodiment of the method of using the friction alignment device for the curved substrate of the present invention.

Referring to FIGS. 4 to 5D, the first preferred embodiment of the method of using the friction alignment device for the curved substrate of the present invention is a schematic diagram of several actions. The present invention provides a method of using a friction alignment device for a curved substrate, comprising the following steps:

Step S81: providing a rotating sleeve, a first friction alignment roller, a first carrying device and a movable platform, the first friction alignment roller is connected to the rotating sleeve, and the outer edge surface having a first curvature plane, the first carrying device is connected to the movable platform, and the first carrying device having a first carrying surface and a first height from the first curvature plane.

Step S82: providing a first curved substrate 30 located on the first carrying surface 311 (shown in FIG. 5A).

Step S83: performing a first linear displacement movement 72 to adjust the first height H1, the first curved substrate 30 is near to the first curvature plane 21 (shown in FIG. 5B).

Step S831: determining whether the first friction alignment roller is located on one end surface of the first curved substrate. When the first friction alignment roller is not located on the end surface, then proceed to Step S832: performing the second linear displacement movement and repeating step S831. When the first friction alignment roller is located on the end surface, then proceed to Step S84.

Step S84: detecting a first contact pressure between the first curved substrate 30 and the first curvature plane 21 (shown in FIG. 5C).

Step S85: determining whether the first contact pressure and an matching pressure are the same; when the first contact pressure and the matching pressure are not the same, repeat step S83; when the first contact pressure and the matching pressure are the same, then proceed to Step S86: rotating the rotating sleeve by a rotational displacement movement 71 along an axial direction 70 as the center, and the first curvature plane 21 rubs the first curved substrate 30 (shown in FIG. 5D).

Step S87: performing a second linear displacement movement parallel to the axial direction.

Step S88: determining whether the first friction alignment roller is located on the first curved surface substrate; when the first friction alignment roller is located on the first curved surface substrate, repeat step S85; when the first friction alignment roller is not located on the first curved surface substrate, then proceed to Step S89: the operation stops.

Figure 6:
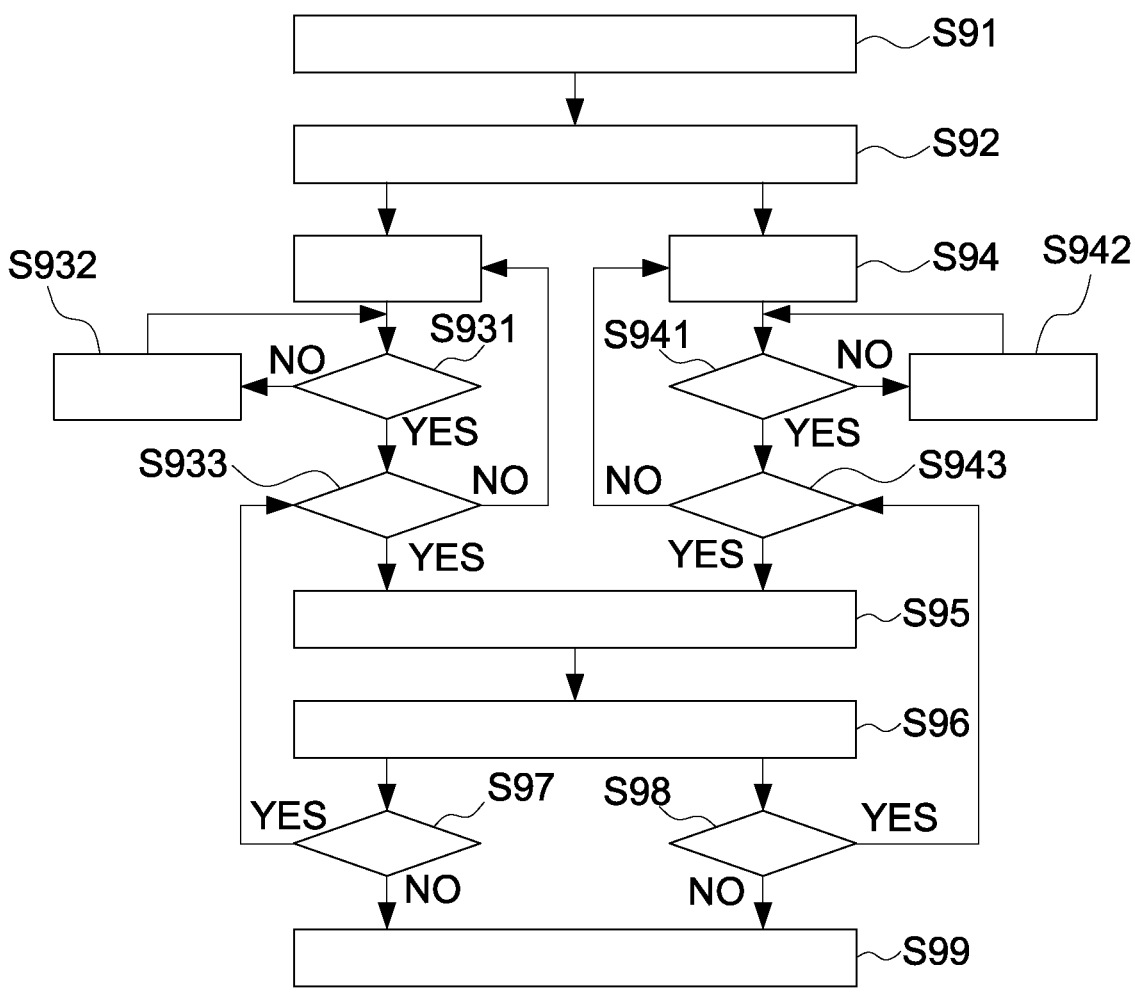
FIG. 6 is a block diagram of the second preferred embodiment of the method of using the friction alignment device for the curved substrate of the present invention.
Figure 7A:
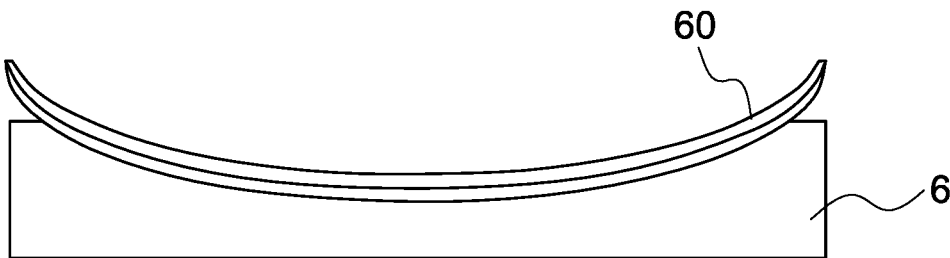
FIG. 7A is a schematic diagram of the first action of the second preferred embodiment of the method of using the friction alignment device for the curved substrate of the present invention.
Figure 7B:
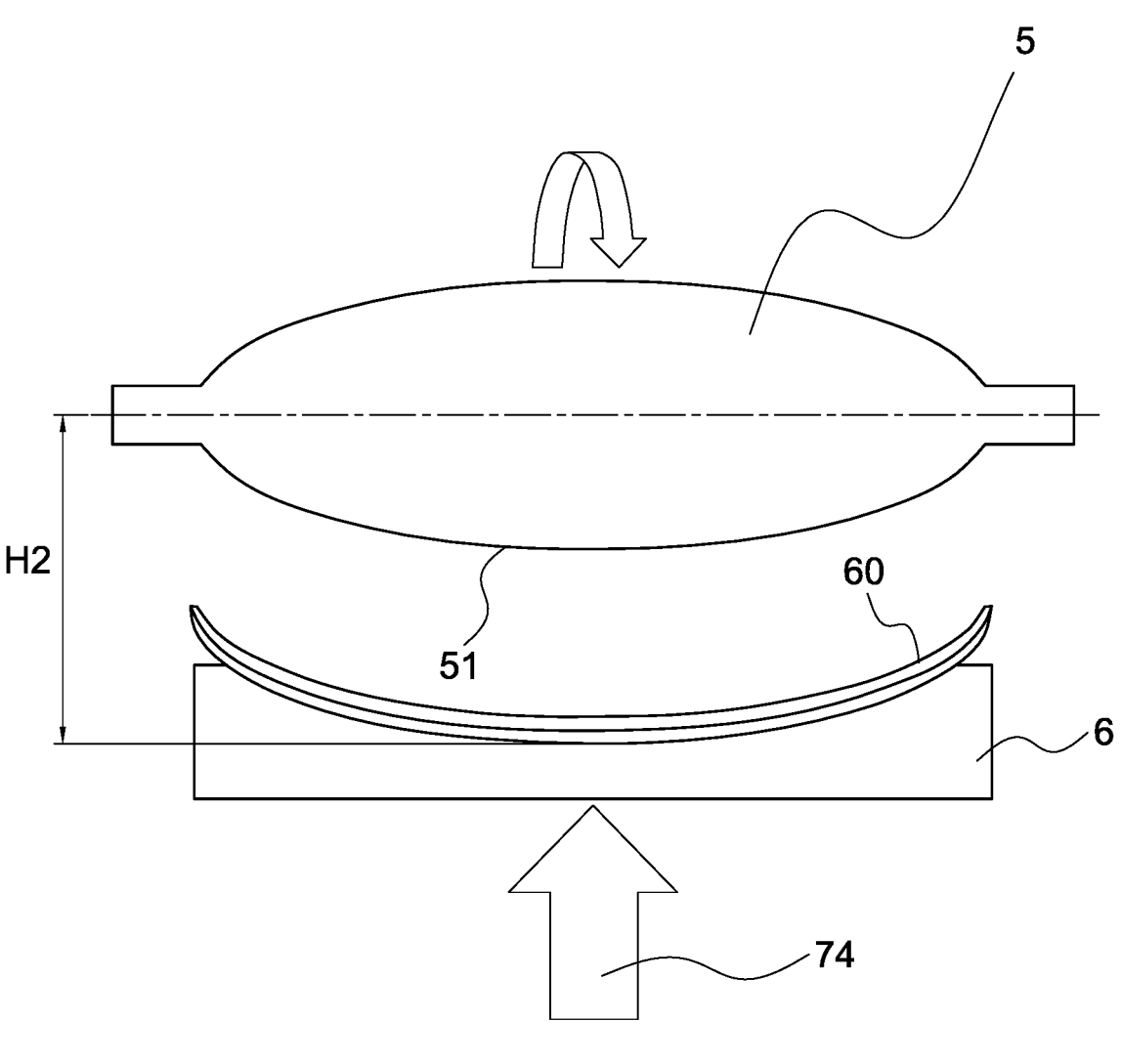
FIG. 7B is a schematic diagram of the second action of the second preferred embodiment of the method of using the friction alignment device for the curved substrate of the present invention.
Figure 7C:
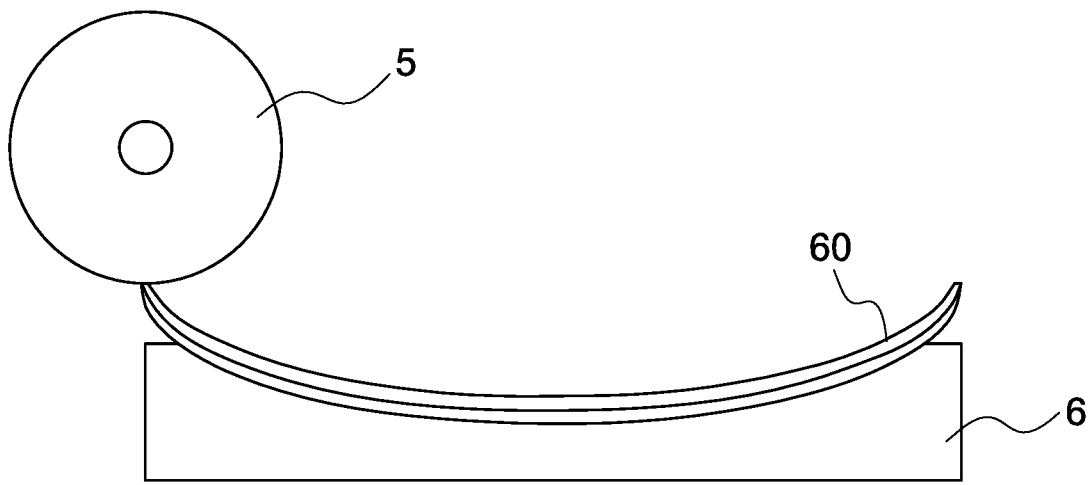
FIG. 7C is a schematic diagram of the third action of the second preferred embodiment of the method of using the friction alignment device for the curved substrate of the present invention.
Figure 7D:
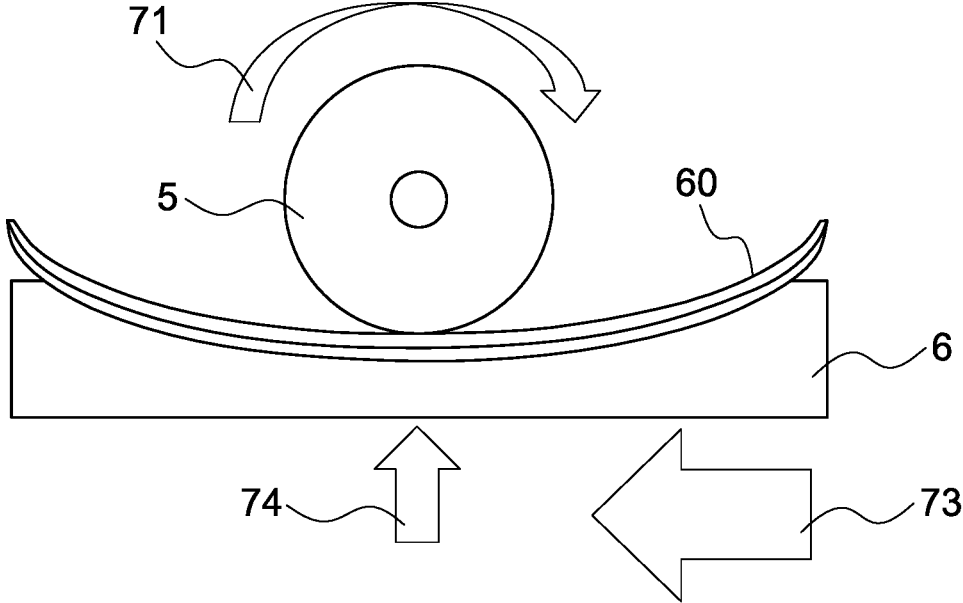
FIG. 7D is a schematic diagram of the fourth action of the second preferred embodiment of the method of using the friction alignment device for the curved substrate of the present invention.
Figure 7E:
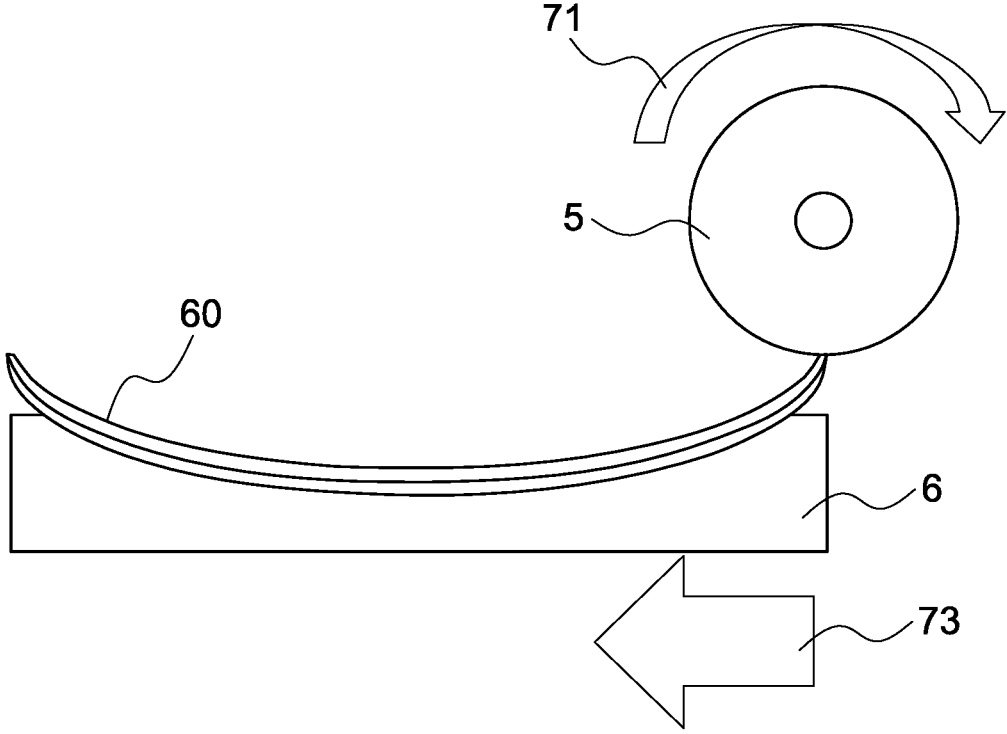
FIG. 7E is a schematic diagram of the fifth action of the second preferred embodiment of the method of using the friction alignment device for the curved substrate of the present invention.

Referring to FIGS. 6 to 7E, the second preferred embodiment of the method of using the friction alignment device for the curved substrate of the present invention is a schematic diagram of several actions. The present invention provides a method of using a friction alignment device for a curved substrate, comprising the following steps:

Step S91: providing a rotating sleeve, a first friction alignment roller, a second friction alignment roller, a first carrying device, a second carrying device and a movable platform, the first friction alignment roller is connected to the rotating sleeve, and the outer edge surface having a first curvature plane, the first carrying device and the second carrying device are connected to the movable platform, and the first carrying device having a first carrying surface and a first height from the first curvature plane, the second friction alignment roller is connected to the rotating sleeve, and the outer edge surface having a second curvature plane, and the second carrying device having a second carrying surface and a second height from the second curvature plane.

Step S92: providing a first curved substrate located on the first carrying surface, and a second curved substrate 60 located on the second carrying surface 611 (shown in FIG. 7A).

Step S93: performing a first linear displacement movement to adjust the first height, the first curved substrate is near to the first curvature plane, and detecting a first contact pressure between the first curved substrate and the first curvature plane.

Step S931: determining whether the first friction alignment roller is located on one end surface of the first curved substrate. When the first friction alignment roller is not located on the end surface, then proceed to Step S932: performing the second linear displacement movement and repeating step S931. When the first friction alignment roller is located on the end surface, performing step S933.

Step S933: determining whether the first contact pressure and an matching pressure are the same; when the first contact pressure and the matching pressure are not the same, repeat step S93.

Step S94: performing a third linear displacement movement 74 to adjust the second height H2 (shown in FIG. 7B), the second curved substrate 60 is near to the second curvature plane 51, and detecting a second contact pressure between the second curved substrate 60 and the second curvature plane 51.

Step S941: determining whether the second friction alignment roller 5 is located on one end surface of the second curved substrate 60 (shown in FIG. 7C). When the second friction alignment roller is not located on the end surface, then proceed to Step S942: performing the second linear displacement movement and repeating step S941. When the second friction alignment roller is located on the end surface, performing step S943 (shown in FIG. 7D).

Step S943: determining whether the second contact pressure and the matching pressure are the same; when the second contact pressure and the matching pressure are not the same, repeat step S94.

Step S95: rotating the rotating sleeve by a rotational displacement movement along an axial direction as the center, when the first contact pressure, the second contact pressure and the matching pressure are the same, the first curvature plane rubbing the first curved substrate and the second curvature plane rubbing the second curved substrate.

Step S96: performing a second linear displacement movement parallel to the axial direction.

Step S97: determining whether the first friction alignment roller is located on the first curved surface substrate; when the first friction alignment roller is located on the first curved surface substrate, repeat step S933.

Step S98: determining whether the second friction alignment roller is located on the second curved surface substrate. When the second friction alignment roller is located on the second curved surface substrate, repeat step S943. When the first friction alignment roller is not located on the first curved surface substrate, and the second friction alignment roller is not located on the second curved surface substrate, then proceed to Step S99: stopping the steps (shown in FIG. 7E).

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A friction alignment device for a curved substrate, comprising:

a rotating sleeve, centered in an axial direction with a rotational displacement movement;

a first friction alignment roller, connected to the rotating sleeve, the surface of the outer edge of the first friction alignment roller having a first curvature plane;

a first carrying device, being a first height away from the axial direction, comprising:

a first vacuum carrier, having a first carrying surface near to the side of the first friction alignment roller, the first curvature plane having the same curvature diameter as the first carrying surface, the first vacuum carrier being carried a first surface substrate, and the first surface substrate being adsorbed on the first carrying surface;

a first pressure sensing element, being telecommunications connected to the first vacuum carrier, the first pressure sensing element detected a first contact pressure of the first curved substrate and the first curvature plane;

a first adjustment seat, connected to the first vacuum carrier, performed a first linear displacement motion to adjust the first height;

a movable platform, connected to the first carrying device, the movable platform caused the first carrying device to carry out a second linear displacement motion, the second linear displacement motion being parallel to the axial direction;

Wherein when the first height being adjusted by the first adjusting seat, the first contact pressure being the same as a matching pressure, the rotating sleeve carried out the rotational displacement movement, the first curvature plane being rubbed against the first curved substrate, and at the same time the movable platform carried out the second linear displacement motion, and the first adjusting seat adjusted the first height according to the surface of the outer edge of the first curved substrate, so that the first contact pressure being the same as the matching pressure.

2. The friction alignment device for a curved substrate as claimed in claim 1, further comprising:

a second friction alignment roller, connected to the rotating sleeve, the surface of the outer edge of the second friction alignment roller having a second curvature plane;

a second carrying device, connected to the movable platform, and being a second height away from the axial direction, comprising:

a second vacuum carrier, having a second carrying surface near to the side of the second friction alignment roller, the second curvature plane having the same curvature diameter as the second carrying surface, the second vacuum carrier being carried a second surface substrate, and the second surface substrate being adsorbed on the second carrying surface;

a second pressure sensing element, being telecommunications connected to the second vacuum carrier, the second pressure sensing element detected a second contact pressure of the second curved substrate and the second curvature plane;

a second adjustment seat, connected to the second vacuum carrier, performed a third linear displacement motion to adjust the second height, the third linear displacement motion being parallel to the first linear displacement motion;

Wherein when the second height being adjusted by the second adjusting seat, the second contact pressure being the same as the matching pressure, the rotating sleeve carried out the rotational displacement movement, the second curvature plane being rubbed against the second curved substrate, and at the same time the movable platform carried out the second linear displacement motion, and the second adjusting seat adjusted the second height according to the surface of the outer edge of the second curved substrate, so that the second contact pressure being the same as the matching pressure.

3. The friction alignment device for a curved substrate as claimed in claim 2, wherein the movable platform further comprising:

a carrier platform, carried both the first adjustment seat and the second adjustment seat;

a lifting moving seat, connected to the carrier platform, performed a fourth linear displacement motion, the fourth linear displacement motion being parallel to the first linear displacement motion;

a directional moving seat, connected to the lifting moving seat, the lifting moving seat carried out the second linear displacement motion.

4. The friction alignment device for a curved substrate as claimed in claim 2, wherein the rotating sleeve further comprising:

a rotating shaft, being a cylinder extending in the axial direction;

a first sleeve, being a hollow ring structure, being placed into the rotating shaft along the axial direction, and being fixed on the rotating shaft by a first positioner, and connected to the first friction alignment roller;

a second sleeve, being a hollow ring structure, being placed into the rotating shaft along the axial direction, and being fixed on the rotating shaft by a second positioner, and connected to the second friction alignment roller.

5. The friction alignment device for a curved substrate as claimed in claim 2, wherein the outer edge surface of the first friction alignment roller and the outer edge surface of the second friction alignment roller have a matching fluff cloth, the matching fluff cloth is made of natural fibers or artificial fibers.

6. The friction alignment device for a curved substrate as claimed in claim 2, wherein the first curvature plane and the second curvature plane have the same curvature diameter, and the center of first curvature plane and the center of second curvature plane are located on the second side of the rotating sleeve.

7. The friction alignment device for a curved substrate as claimed in claim 2, wherein the curvature diameters of the first curvature plane and the second curvature plane are between 20 millimeters and 1000 millimeters.

8. A method of using a friction alignment device for a curved substrate, comprising the following steps:

(a) providing a rotating sleeve, a first friction alignment roller, a first carrying device and a movable platform, the first friction alignment roller is connected to the rotating sleeve, and the outer edge surface having a first curvature plane, the first carrying device is connected to the movable platform, and the first carrying device having a first carrying surface and a first height from the first curvature plane;

(b) providing a first curved substrate located on the first carrying surface;

(c) performing a first linear displacement movement to adjust the first height, the first curved substrate is near to the first curvature plane;

(d) detecting a first contact pressure between the first curved substrate and the first curvature plane;

(e) determining whether the first contact pressure and an matching pressure are the same; when the first contact pressure and the matching pressure are not the same, repeat step (c); when the first contact pressure and the matching pressure are the same, rotating the rotating sleeve by a rotational displacement movement along an axial direction as the center, and the first curvature plane rubbing the first curved substrate;

(f) performing a second linear displacement movement parallel to the axial direction;

(g) determining whether the first friction alignment roller is located on the first curved surface substrate; when the first friction alignment roller is located on the first curved surface substrate, repeat step (d); when the first friction alignment roller is not located on the first curved surface substrate, the operation stops.

9. The method of using a friction alignment device for a curved substrate as claimed in claim 8, the step (c) further includes the following steps:

(c1) determining whether the first friction alignment roller is located on one end surface of the first curved substrate;

(c2) performing the second linear displacement movement and repeating step (c1), when the first friction alignment roller is not located on the end surface; performing step (d), when the first friction alignment roller is located on the end surface.

10. A method of using a friction alignment device for a curved substrate, comprising the following steps:

(a) providing a rotating sleeve, a first friction alignment roller, a second friction alignment roller, a first carrying device, a second carrying device and a movable platform, the first friction alignment roller is connected to the rotating sleeve, and the outer edge surface having a first curvature plane, the first carrying device and the second carrying device are connected to the movable platform, and the first carrying device having a first carrying surface and a first height from the first curvature plane, the second friction alignment roller is connected to the rotating sleeve, and the outer edge surface having a second curvature plane, and the second carrying device having a second carrying surface and a second height from the second curvature plane;

(b) providing a first curved substrate located on the first carrying surface, and a second curved substrate located on the second carrying surface;

(c) performing a first linear displacement movement to adjust the first height, the first curved substrate is near to the first curvature plane, and detecting a first contact pressure between the first curved substrate and the first curvature plane;

(d) determining whether the first contact pressure and an matching pressure are the same; when the first contact pressure and the matching pressure are not the same, repeat step (c);

(e) performing a third linear displacement movement to adjust the second height, the second curved substrate is near to the second curvature plane, and detecting a second contact pressure between the second curved substrate and the second curvature plane;

(f) determining whether the second contact pressure and the matching pressure are the same; when the second contact pressure and the matching pressure are not the same, repeat step (e);

(g) rotating the rotating sleeve by a rotational displacement movement along an axial direction as the center, when the first contact pressure, the second contact pressure and the matching pressure are the same, the first curvature plane rubbing the first curved substrate and the second curvature plane rubbing the second curved substrate;

(h) performing a second linear displacement movement parallel to the axial direction;

(i) determining whether the first friction alignment roller is located on the first curved surface substrate; when the first friction alignment roller is located on the first curved surface substrate, repeat step (d);

(j) determining whether the second friction alignment roller is located on the second curved surface substrate; when the second friction alignment roller is located on the second curved surface substrate, repeat step (f);

(k) stopping the steps, when the first friction alignment roller is not located on the first curved surface substrate, and the second friction alignment roller is not located on the second curved surface substrate.

11. The method of using a friction alignment device for a curved substrate as claimed in claim 10, the step (c) further includes the following steps:

(c1) determining whether the first friction alignment roller is located on one end surface of the first curved substrate;

(c2) performing the second linear displacement movement and repeating step (c1), when the first friction alignment roller is not located on the end surface; performing step (d), when the first friction alignment roller is located on the end surface.

12. The method of using a friction alignment device for a curved substrate as claimed in claim 10, the step (e) further includes the following steps:

(e1) determining whether the second friction alignment roller is located on one end surface of the second curved substrate;

(e2) performing the second linear displacement movement and repeating step (e1), when the second friction alignment roller is not located on the end surface; performing step (f), when the second friction alignment roller is located on the end surface.

* * * * *